April 21, 1942. R. B. COTTRELL 2,280,428
DRAFT GEAR
Filed Oct. 14, 1940 2 Sheets-Sheet 1
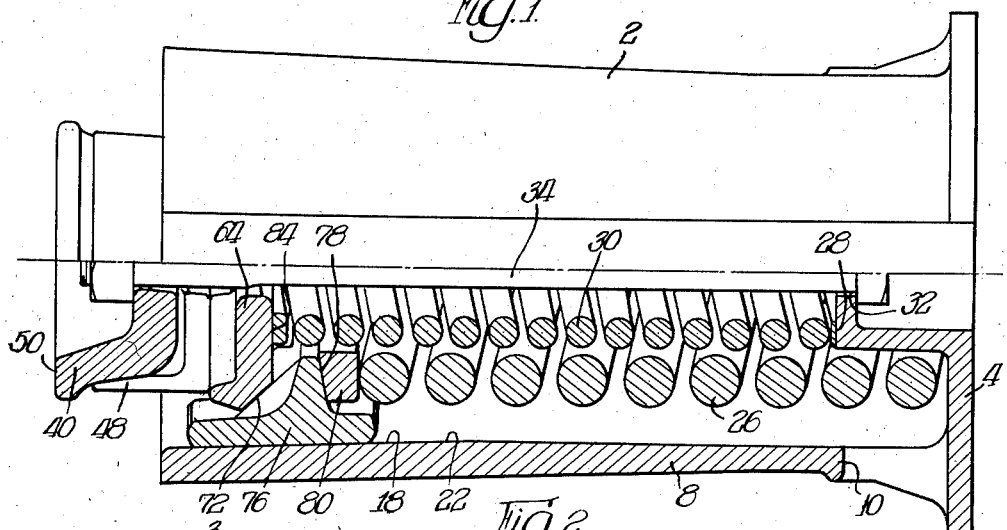
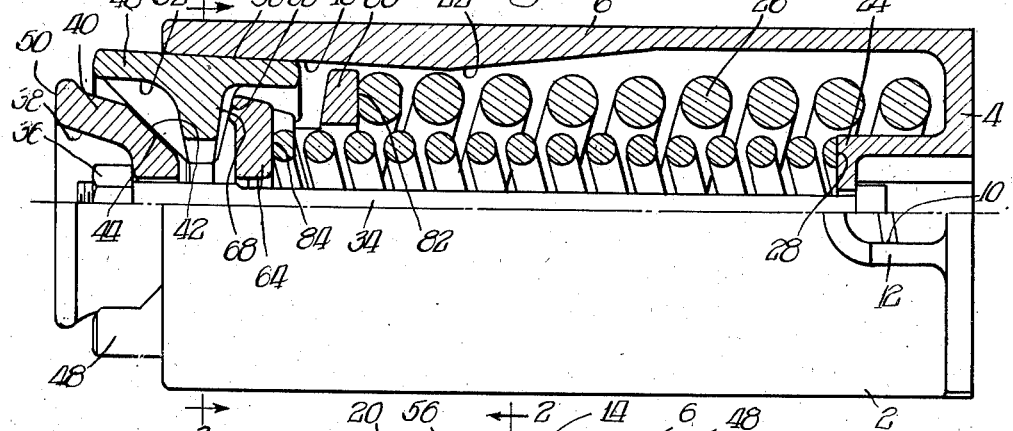
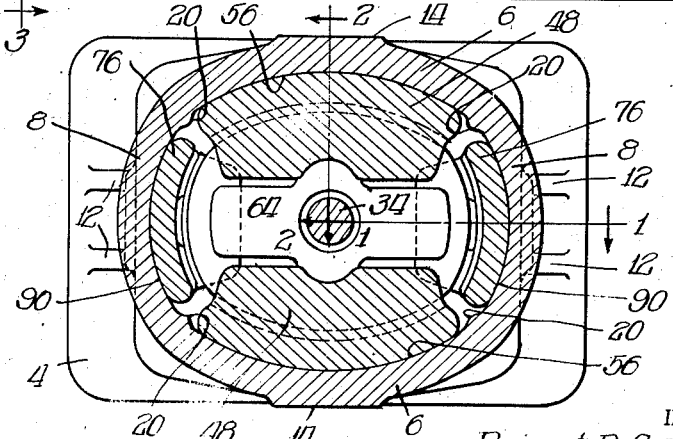
INVENTOR.
Robert B. Cottrell,
BY
ATTY.

April 21, 1942.     R. B. COTTRELL     2,280,428
DRAFT GEAR
Filed Oct. 14, 1940     2 Sheets-Sheet 2
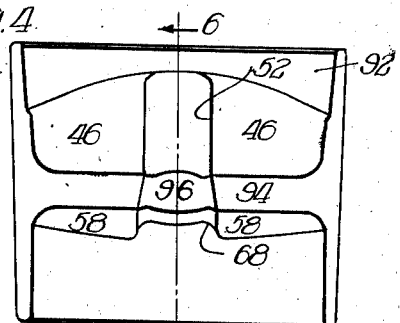
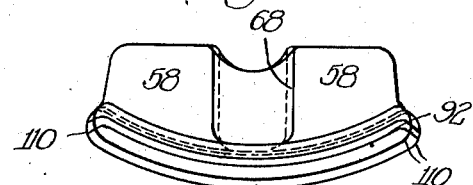
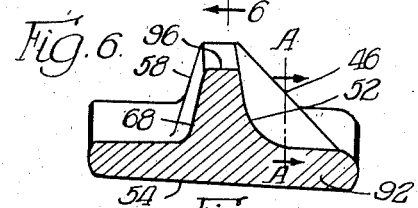
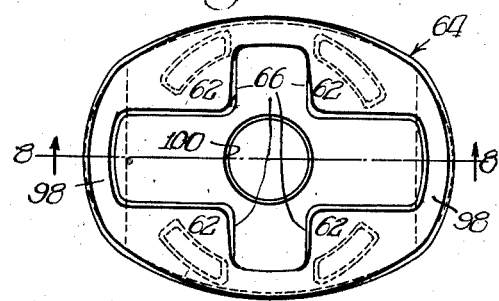
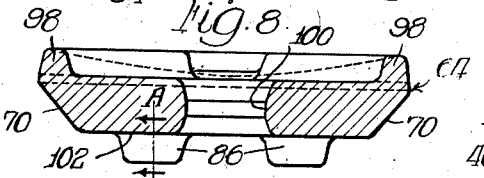
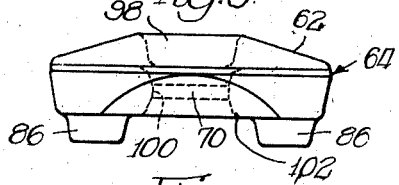
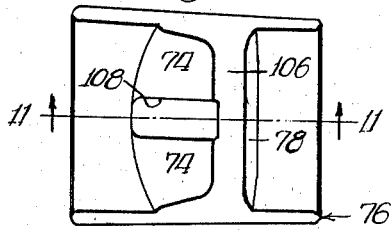
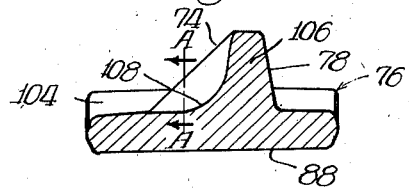
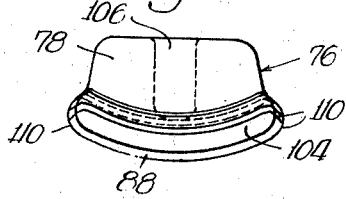
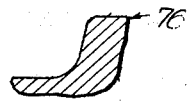
INVENTOR.
Robert B. Cottrell,
BY Patented Apr. 21, 1942

2,280,428

UNITED STATES PATENT OFFICE 2,280,428

DRAFT GEAR

Robert B. Cottrell, Chicago, Ill., assignor to American Steel Foundries, Chicago, Ill., a corporation of New Jersey Application October 14, 1940, Serial No. 361,052

18 Claims. (Cl. 213—32)

My invention relates to a friction absorbing device or draft gear of a type commonly referred to as barrel type wherein is housed a compression spring and friction means, sometimes called a clutch mechanism.

In my novel arrangement, a barrel housing which serves as a column is generally oval shaped with tapered friction surfaces around the open end and with a clutch mechanism comprising sets of shoes arranged diametrically opposite each other with the respective sets of shoes seated against the friction surfaces of the housing along the long and short diameters of said oval end. The generic idea for such a gear has been set forth in my Patent No. 2,207,287, issued by the United States Patent Office July 9, 1940.

A general object of my invention is to devise an improved form of series or multiple action draft gear wherein the shoes are cross equalized and arranged in series and wherein novel means is afforded to prevent rotation of arcuate shoes within the oval housing.

An object of my present novel arrangement is to devise such a draft gear as above described wherein novel means will be provided to prevent relative rotation of the clutch mechanism within the housing. A more specific object is to devise such a draft gear mechanism wherein there are interposed between the friction surfaces at the opposite end of the housing a plurality of longitudinally arranged ribs against which the edges of the shoes may seat to prevent rotation of the shoes within the housing.

A different object of my invention is to devise a draft gear such as above described including two sets of shoes arranged along the long and short diameters of the oval housing with the wedge block intervening between said sets of shoes, and said wedge block having a bearing against each shoe of each set on spaced diagonally arranged faces which will facilitate the seating of said block against said shoes.

My invention further comprehends such an arrangement as that described wherein a follower wedge at the outermost end of the device is afforded spaced bearing areas against each shoe of the outer set.

My invention further contemplates a draft gear arrangement of the class described, wherein a plurality of compression springs are afforded and a spring cap is interposed between the innermost set of shoes and one of said springs while the other of said springs may have direct bearing against the before-mentioned wedge block.

Figure 1 is a top plan view, half in section, of the draft gear embodying my invention, the section being taken substantially in the plane bisecting the device horizontally as indicated by the line 1—1 of Figure 3.

Figure 2 is a side elevation, half in section, the section being taken in a plane bisecting the device substantially at right angles to the section shown in Figure 1 and as indicated by the line 2—2 of Figure 3.

Figure 3 is a sectional view through the friction end of the device adjacent the open end thereof, and taken substantially in the plane indicated by the line 3—3 of Figure 2.

Figure 4 is a plan view of one of the larger or outer friction shoes taken from the inner face thereof; Figure 5 is an end view thereof taken from the lower end as seen in Figure 4; Figure 6 is a sectional view therethrough in a plane bisecting the shoe substantially as indicated by the line 6—6 of Figure 4; and Figure 6A is a fragmentary sectional view taken transversely through the shoe substantially in the plane indicated by the line A—A of Figure 6.

Figure 7 is a top plan view of the wedge block; Figure 8 is a sectional view on the long axis thereof, taken substantially in the plane indicated by the line 8—8 of Figure 7.

Figure 8A is a fragmentary sectional view taken through the spring positioning means on the inner face of the block, substantially in the plane indicated by the line A—A of Figure 8.

Figure 9 is an end view of the wedge block.

Figure 10 is a plan view of one of the smaller or inner friction shoes taken from the radially inner face thereof.

Figure 11 is a sectional view through the shoe shown in Figure 10, the section being taken in a plane bisecting the shoe substantially as indicated by the line 11—11 of Figure 10.

Figure 11A is a fragmentary sectional view through the shoe shown in Figure 10, the section being taken substantially in the transverse plane indicated by the line A—A of Figure 11.

Figure 12 is an end view of the shoe shown in Figures 10 and 11, the view being taken from the inner end or from the right as seen in Figure 10.

Describing my novel draft gear structure in greater detail, the housing 2 is a column of generally oval form, having the rectangular base or seating means 4 and rounded top and bottom walls 6, 6 merging with the lateral walls 8, 8 to form a generally oval barrel or housing. Openings 10, 10 are formed in the walls 8, 8 adjacent the base 4, and reinforcing ribs 12, 12 are afforded at the margins of said openings. On the top and bottom walls 6, 6 are formed flat seating surfaces 14, 14 upon which the draft gear may conveniently rest when in operating position. Around the oval open end of the housing are formed arcuate friction surfaces, the relatively large arcuate friction surfaces 16, 16 being formed along the top and bottom walls 6, 6 and relatively small arcuate surfaces 18, 18 being formed along the lateral walls 8, 8. Between adjacent friction surfaces are formed the longitudinal flanges or ridges 20, 20, said flanges extending longitudinally from the open end of said housing to the inner end of the friction surfaces which terminate approximately at the point indicated at 22 (Figures 1 and 2). A hollow stud 24 is centrally formed on the base 4 of the housing and said stud serves as positioning means for the outer compression spring 26 and also affords a seat as at 28 for the inner release and compression spring 30. In the end of the stud 24 is formed an opening 32 for reception of the retaining bolt 34 extending for the length of the device, the head of said bolt being seated within said hollow stud 24. On the open threaded end of the retaining bolt 34 may be fixed the threaded nut 36, said nut being seated within the cup-like cavity 38 formed on the outer face of the follower wedge 40. The follower wedge 40 is afforded spaced seats which have diagonal engagement as at 44 (Figure 2) with the spaced surfaces 46, 46 formed on each of the relatively large outer friction shoes 48, 48, and follower wedge 40 is slightly relieved between the spaced shoe engaging surfaces as is indicated at 42 (Figure 2). Each outer friction shoe 48 is also relieved as at 52 between the follower engaging surfaces 46, 46 and each of said shoes is formed with a friction surface 54 complementary to the friction surface 16 on the housing against which it is seated as at 56 (Figure 3). Each outer shoe 48 is formed with spaced diagonal surfaces 58, 58 (Figure 4) having engagement as at 60 with spaced diagonal surfaces 62, 62 (Figure 7) formed on the outer face of the wedge block 64 and at the sides thereof. Between the diagonal faces 62, 62 the wedge block is relieved as at 66 (Figure 7) and similarly each friction shoe 48 is relieved as at 68 (Figure 6) between the friction surfaces 58. On the inner face of the wedge block 64 and at opposite ends thereof are formed the diagonal surfaces 70, 70 (Figure 8) which may seat as at 72 (Figure 1) against spaced diagonal surfaces 74, 74 formed on each of the inner friction shoes 76, 76. Each inner shoe is afforded diagonal face engagement as at 78 against the spring cap 80 and said spring cap bears as at 82 against the outer end of the main compression spring 26. The inner or auxiliary compression spring 30 bears as at 84 against the inner face of the wedge block 64 and is positioned with respect thereto between spring positioning means 86, 86 (Figures 8 and 9). Each inner friction shoe 76 is formed with an arcuate friction surface 88 which has complementary engagement as at 90 with the tapering friction surface 18 formed on the adjacent side wall 8.

The longitudinal ribs 20, 20 formed on the housing to prevent relative rotation of the shoes when seated therewithin are defined by smooth radii and the edges of the shoes are similarly formed in order that there may be no sharp engaging surfaces between said longitudinal flanges and the edges of the shoes.

The form of each outer friction shoe is shown in detail in Figures 4, 5, and 6. It may be described as a compact structure having an arcuate vertical wall 92 having the outer tapering friction face 54 which may seat against the housing and presenting an inwardly projecting central shelf 94 centrally relieved as at 96, said shelf being formed with the outer diagonal follower engaging surfaces 46, 46 and the intervening slot or relieved portion 52, said shelf having also the inner diagonally arranged faces 58, 58 between which may be formed the slot or relieved portion 66. Each shoe has slightly greater width as may be noted from Figures 4 and 5, at the outer end than at the inner end to accommodate the taper of the friction end of the housing.

The detail of the wedge block 64 is shown in Figures 7 to 9 inclusive. It may be noted said wedge block is a solid body of metal of generally flat oval form on the outer face of which, and at opposite sides thereof, are formed the beforementioned spaced diagonal outer shoe engaging faces 62, 62 with the intervening channel or relieved portion 66 and outwardly projecting arcuate flanges 98, 98 to reinforce the end portion of the block. Centrally formed in the block is the opening 100 for accommodation of the securing bolt. On the inner face of the wedge block and at opposite ends thereof are formed the before-mentioned diagonal faces 70, 70 for engagement with the inner friction shoes and centrally of the inner face is formed the flat annular surface 102 against which may seat the inner compression spring 30.

The detail of the inner friction shoe is shown in Figures 10, 11, and 12 wherein it may be seen that said shoe has the configuration generally similar to that of the outer friction shoe with the arcuate vertical wall 104 presenting on its outer face the before-mentioned tapering friction surface 88, said shoe also having the inwardly directed shelf portion 106 on the outer face of which are formed the spaced diagonal faces 74, 74 with the intervening slot or relieved portion 108, while on the inner face of said shelf portion may be formed the diagonal surface 78 against which may seat the spring cap 80 as already described. As in the case of the outer shoes, each inner shoe is also of tapering form having a greater width at its outer end than at its inner end as may be seen from the view of Figures 10 and 12, thus accommodating said shoes to the tapering form of the friction end of the housing.

The vertical edges of each inner and outer shoe are defined as at 110 by smooth radii which permits said shoe to bear against the vertical flanges 20, 20 of the housing without gouging, said bearing preventing the rotation of said shoes within said housing as already described.

To those skilled in the art it will be apparent that I have described a novel form of friction absorbing device wherein a plurality of sets of shoes are arranged in series with an intervening wedge block in such manner that the second set of shoes multiplies the resistance of the first set of shoes in a manner to afford a greater shock absorption for a given spring capacity than could otherwise be obtained. Also in my novel arrangement the shoes are cross equalized by placing the shoes of each set diametrically opposite each other on the respective long and short diameters of the oval end of the housing, and interposed between the respective sets of shoes is the before-mentioned wedge block.

Furthermore I have so designed my novel gear that the unit pressure of the shoes of respective sets against the housing may be substantially equalized. In other words, the outer shoes have larger areas to accommodate the greater pressures exerted by them against the housing as compared with the pressures exerted by the relatively small shoes of the inner set.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a draft gear, a housing having an oval end with pairs of opposite internal tapering arcuate friction faces arranged in two sets aligned along and long and short axes of said oval end, inwardly extending longitudinal flanges on said housing interposed between adjacent faces, a compression spring, a release spring, a wedge spring cap, a wedge follower, two sets of friction shoes arranged in series between said cap and follower in abutment with said respective sets of faces and prevented from rotation by said flanges, and a wedge block interposed between respective sets of shoes, said wedge follower having diagonal face engagement with each shoe of one set on spaced areas lying in a single plane adjacent one end of the shoe and said wedge block having diagonal face engagement with each of said last-mentioned shoes on spaced areas lying in a single plane adjacent the opposite end of the shoe.

2. In a draft gear, a housing having an oval end with pairs of opposite internal tapering arcuate friction faces arranged in two sets aligned along the long and short axes of said oval end, inwardly extending longitudinal flanges on said housing interposed between adjacent faces, a compression spring, a release spring, a wedge spring cap, a wedge follower, two sets of friction shoes arranged in series between said cap and follower in abutment with said respective sets of faces and guided by said flanges, and a wedge block interposed between respective sets of shoes, said follower having diagonal face engagement on a plurality of spaced areas with each shoe of one set, said wedge block having diagonal face engagement on spaced areas with each shoe of one set and each shoe of the other set having diagonal face engagement with a single area on said wedge block.

3. In a draft gear, a housing having an oval end with pairs of opposite internal tapering friction faces arranged in two sets aligned along the long and short axes of said oval end, inwardly extending longitudinal flanges on said housing interposed between adjacent faces, a compression spring, a release spring, a wedge spring cap, a wedge follower, two sets of friction shoes arranged in series between said cap and follower in abutment with said respective sets of faces and prevented from rotation by said flanges, and a wedge block interposed between respective sets of shoes, said spring cap having diagonal face engagement with each shoe of one set and said wedge follower having diagonal face engagement with each shoe of the other set along a plurality of spaced areas lying in a single plane, said wedge block having diagonal engagement on one face thereof with the shoes of one set and on the opposite face thereof with the shoes of the other set.

4. In a draft gear, a housing having an oval end with pairs of opposite internal tapering arcuate friction faces arranged in two sets aligned along the long and short axes of said oval end, inwardly extending longitudinal flanges on said housing interposed between adjacent faces, a compression spring, a release spring, a wedge spring cap, a wedge follower, two sets of friction shoes arranged in series between said cap and follower in abutment with said respective sets of faces and guided by said flanges, and a wedge block interposed between respective sets of shoes, said wedge block having diagonal face engagement with each shoe of one set on a plurality of spaced areas and having single diagonal face engagement with each shoe of the other set.

5. In a friction absorbing device, a column in the form of an oval housing with sets of internal tapering arcuate friction faces adjacent the open end thereof, said sets being aligned with the long and short axes of said oval end, a compression spring, a follower, two sets of friction shoes arranged in series between said follower and said spring in abutment with said sets of faces respectively, a wedge block interposed between said sets of shoes in diagonal face engagement with each shoe of each set on spaced areas, and inwardly extending flanges on said housing along the margins of said faces affording abutment for said shoes to prevent rotation thereof, said flanges and adjacent edges of said shoes being defined by smooth radii to prevent gouging thereof.

6. In a friction absorbing device, a housing having two sets of opposed tapering arcuate internal friction faces, inwardly extending longitudinal internal flanges on said housing at the margins of said faces, a compression spring, a release spring, a spring cap, a follower wedge, two sets of shoes arranged in series between said follower wedge and said spring cap and seated against said sets of faces respectively, and a wedge block interposed between said sets of shoes, said spring cap having diagonal face engagement with the shoes of one set, said follower wedge having diagonal face engagement with the shoes of the other set and said wedge block having diagonal face engagement with both shoes of both sets.

7. In a draft gear, a housing having an oval end with pairs of opposite internal tapering arcuate friction faces arranged in two sets aligned along the long and short axes of said oval end, inwardly extending longitudinal flanges on said housing interposed between adjacent faces, a compression spring, a release spring, a wedge spring cap, a wedge follower, two sets of friction shoes arranged in series between said cap and follower in abutment with said respective sets of faces and guided by said flanges, and a wedge block interposed between respective sets of shoes, said follower having diagonal face engagement on a plurality of spaced areas with each shoe of one set.

8. In a friction absorbing device, a housing having two sets of opposed tapering arcuate internal friction faces, inwardly extending longitudinal internal flanges on said housing at the margins of said faces, a compression spring, a release spring, a spring cap, a follower wedge, two sets of shoes arranged in series between said follower wedge and said spring cap and seated against said sets of faces respectively, and a wedge block interposed between said sets of shoes, said follower wedge having diagonal face engagement with spaced areas presented by each shoe of one set and said spring cap having diagonal face engagement with the shoes of the other set.

9. In a friction absorbing device, a column in the form of an oval housing with sets of internal tapering arcuate friction faces adjacent the open end thereof, said sets being aligned with the long and short axes of said oval end, a compression spring, a follower, two sets of friction shoes arranged in series between said follower and said spring in abutment with said sets of faces respectively, a wedge block interposed between said sets of shoes in diagonal face engagement therewith, and inwardly extending flanges on said housing along the margins of said faces affording abutment for said shoes to prevent rotation thereof.

10. In a friction absorbing device, a housing having two sets of opposed tapering internal arcuate friction faces, longitudinal internal flanges on said housing at the margins of said faces, a compression spring, a release spring, a spring cap, a follower wedge, two sets of shoes arranged in series between said follower wedge and said spring cap and seated against said sets of faces respectively, and a wedge block interposed between said sets of shoes, said wedge block having diagonal face engagement with spaced areas on each shoe of each set and said release spring bearing against said wedge block.

11. In a draft gear, a housing having an oval end with internal tapering friction faces arranged in two sets aligned with the long and short axes of said oval end, inwardly directed longitudinal flanges along the margins of said faces, a compression spring, a follower, two sets of shoes arranged in series between said follower and said springs in abutment with said sets of faces respectively, and a wedge block interposed between said sets of shoes and having diagonal engagement on one face thereof with each shoe of one set and on the other face thereof with each shoe of the other set, said longitudinal flanges affording abutment for said shoes to prevent rotation thereof within said housing.

12. In a draft gear, a housing having an oval end with internal tapering arcuate friction faces arranged in two sets aligned with the long and short axes of said oval end, a plurality of compression springs, a follower, and two sets of friction shoes arranged in series between said follower and one of said springs in abutment with said sets of faces respectively, a wedge block interposed between said sets of shoes, and longitudinal inwardly projecting flanges on said housing affording abutments for said shoes to prevent relative rotation thereof.

13. In a friction absorbing device, a housing having two sets of opposed tapering internal friction faces, longitudinal internal flanges on said housing at the margins of said faces, a compression spring, a release spring, a spring cap, a follower wedge, two sets of shoes arranged in series between said follower wedge and said spring cap and seated against said sets of faces respectively, and a wedge block interposed between said sets of shoes, said wedge block having diagonal engagement on one face thereof with both shoes of one set and on the opposite face thereof with both shoes of the other set.

14. In a friction absorbing device, a housing having two sets of opposed tapering internal arcuate friction faces, longitudinal internal flanges on said housing at the margins of said faces, a compression spring, a release spring, a spring cap, a follower wedge, two sets of shoes arranged in series between said follower wedge and said spring cap and seated against said sets of faces respectively, said shoes being prevented from rotation by said flanges, and a wedge block interposed between said sets of shoes, said spring cap having diagonal face engagement with the shoes of one set.

15. In a friction absorbing device, a housing having two sets of opposed tapering internal arcuate friction faces, longitudinal internal flanges on said housing at the margins of said faces, a compression spring, a release spring, a spring cap, a follower wedge, two sets of shoes arranged in series between said follower wedge and said spring cap and seated against said sets of faces respectively, and a wedge block interposed between said sets of shoes and presenting spaced areas for diagonal face engagement with each shoe of one set and single areas for diagonal face engagement with each shoe of the other set, said release spring bearing against said wedge block.

16. In a draft gear, a housing having an oval end with arcuate internal friction faces aligned with the long and short axes of said oval end, a compression spring, a spring cap seated on said spring, a follower wedge, two sets of shoes arranged in series between said follower wedge and said spring cap and seated against said faces, a wedge block interposed between said sets of shoes with each shoe of each set presenting spaced areas diagonally engaging said block, and inwardly extending flanges defining the friction faces on said housing for cooperation with said shoes to prevent rotation thereof.

17. In a draft gear, a housing having an oval end with arcuate internal friction faces aligned with the long and short axes of said oval end, a compression spring, a spring cap seated on said spring, a follower wedge, two sets of shoes arranged in series between said follower wedge and said spring cap and seated against said faces, said spring cap having diagonal face engagement with one set of shoes, a wedge block interposed between said sets of shoes with each shoe of each set presenting spaced areas diagonally engaging said block, and inwardly extending flanges defining the friction faces on said housing for cooperation with said shoes to prevent rotation thereof.

18. In a draft gear, a housing having an oval end with arcuate internal friction faces aligned with the long and short axes of said oval end, a compression spring, a spring cap seated on said spring, a follower wedge, inner and outer sets of shoes arranged in series between said follower wedge and said spring cap and seated against said faces, a wedge block interposed between said sets of shoes with each shoe of each set presenting spaced areas diagonally engaging said block, inwardly extending flanges defining the friction faces on said housing for cooperation with said shoes to prevent rotation thereof, said inner set of shoes having diagonal engagement with said spring cap, and each shoe of the outer set presenting spaced areas for engagement with said follower wedge.

ROBERT B. COTTRELL.